(12) United States Patent
Tylutki et al.

(10) Patent No.: US 9,624,809 B2
(45) Date of Patent: Apr. 18, 2017

(54) MONITORING SYSTEM FOR A SINGLE CAN OXIDATION CATALYST/PARTICULATE FILTER

(71) Applicant: GM Global Technology Operations LLC, Detroit, MI (US)

(72) Inventors: Vincent J. Tylutki, Livonia, MI (US); David N. Belton, Birmingham, MI (US); Janean E. Kowalkowski, Northville, MI (US); Igor Anilovich, Walled Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 91 days.

(21) Appl. No.: 14/020,247

(22) Filed: Sep. 6, 2013

(65) Prior Publication Data

US 2015/0071823 A1 Mar. 12, 2015

(51) Int. Cl.
| | |
|---|---|
| *F01N 11/00* | (2006.01) |
| *F01N 3/035* | (2006.01) |
| *F01N 3/18* | (2006.01) |
| *F01N 3/20* | (2006.01) |

(52) U.S. Cl.
CPC ............ *F01N 11/002* (2013.01); *F01N 3/035* (2013.01); *F01N 3/18* (2013.01); *F01N 3/2066* (2013.01)

(58) Field of Classification Search
CPC ......... F01N 3/023; F01N 3/2066; F01N 9/005
See application file for complete search history.

(56) References Cited

U.S. PATENT DOCUMENTS

| | | | |
|---|---|---|---|
| 2008/0264037 A1* | 10/2008 | Takahashi et al. | ............. 60/277 |
| 2009/0235623 A1 | 9/2009 | Lerdung | |
| 2010/0050757 A1 | 3/2010 | Liu et al. | |
| 2010/0076666 A1* | 3/2010 | Yanakiev et al. | ............. 701/103 |
| 2010/0313547 A1 | 12/2010 | Gonze et al. | |
| 2011/0066316 A1* | 3/2011 | Perrard | .......................... 701/29 |
| 2013/0098146 A1* | 4/2013 | Shibata et al. | ............. 73/114.75 |

FOREIGN PATENT DOCUMENTS

| | | |
|---|---|---|
| DE | 10223629 A1 | 1/2004 |
| DE | 102005042843 A1 | 11/2006 |
| DE | 102005051261 A1 | 5/2007 |

(Continued)

OTHER PUBLICATIONS

English translation of FR2919667 obtained Apr. 15, 2016.*

(Continued)

*Primary Examiner* — Jill Warden
*Assistant Examiner* — Matthew Krcha
(74) *Attorney, Agent, or Firm* — Cantor Colburn LLP

(57) ABSTRACT

A monitoring system for a single can oxidation catalyst (OC)/particulate filter (PF) member includes a controller including a first temperature sensor input configured to receive a first exhaust temperature upstream of an OC portion of the single can OC/PF member, a second temperature sensor input configured to receive a second exhaust temperature downstream of the first temperature. The controller is configured and disposed to calculate an exothermic capacity of the OC portion and determine washcoat deterioration of a PF portion of the single can OC/PF member based on the exothermic capacity of the OC portion.

3 Claims, 2 Drawing Sheets

(56) References Cited

FOREIGN PATENT DOCUMENTS

| | | |
|---|---|---|
| DE | 112005003105 T5 | 10/2007 |
| DE | 102008054341 A1 | 3/2010 |
| DE | 102010022940 A1 | 2/2011 |
| FR | 2919667 A3 | 2/2009 |
| WO | WO 2011135710 A1 * | 11/2011 |

OTHER PUBLICATIONS

"Dieselpartikelfilter-Reinigung," Wikipedia, Jul. 13, 2013, 8 (8 pgs.) https://de.wikipedia.org/wiki/Dieselpartikelfilter-Reinigung.
Office Action issued on Feb. 3, 2016 in corresponding DE Patent Application No. 10 2014 112 036.0.

* cited by examiner

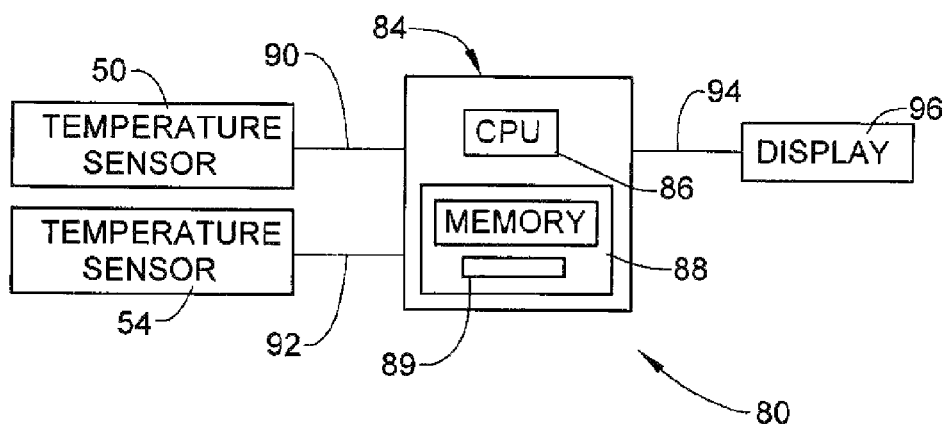
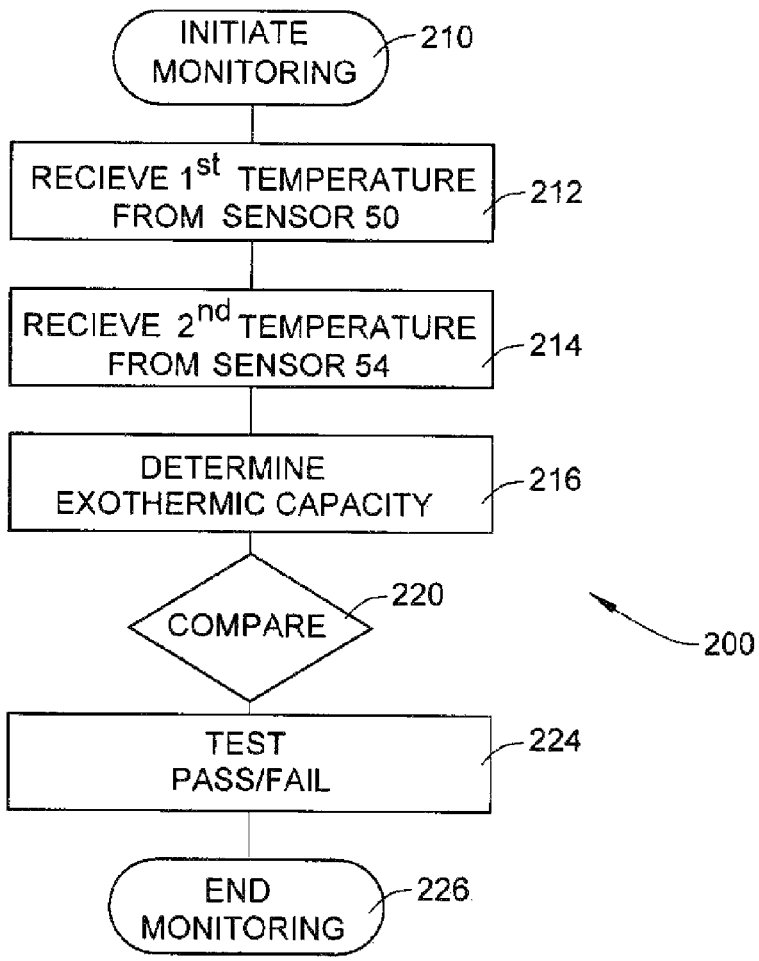

MONITORING SYSTEM FOR A SINGLE CAN OXIDATION CATALYST/PARTICULATE FILTER

FIELD OF THE INVENTION

The subject invention relates to the art of motor vehicles and, more particularly, to a monitoring system for a single can oxidation catalyst (OC)/particulate filter (PF).

BACKGROUND

Exhaust gas emitted from an internal combustion engine is a heterogeneous mixture that contains gaseous emissions such as, but not limited to, carbon monoxide ("CO"), unburned hydrocarbons ("HC") and oxides of nitrogen ("$NO_x$"), as well as condensed phase materials (liquids and solids) that constitute particulate matter ("PM"). Catalyst compositions, typically disposed on catalyst supports or substrates, are provided in an engine exhaust system as part of an aftertreatment system to convert certain, or all of these exhaust constituents into non-regulated exhaust gas components.

One type of exhaust treatment technology for reducing emissions is a particulate filter ("PF"). The PF is designed to remove diesel particulate matter, or soot, from exhaust gas of an engine. The particulate matter removed from the exhaust is entrapped by, and entrained in, the PF. When accumulated soot reaches a predetermined level the PF is either replaced or regenerated. Replacement or regeneration facilitates that soot removal continues at desired parameters. In addition, many engines include an oxidation catalyst ("OC") that oxidizes hydrocarbons and carbon monoxide into carbon dioxide and water. In some cases, the PF and OC are arranged in a single component.

Many engines include a controller having a soot out monitor that predicts soot accumulation in the PF. The soot out monitor employs complex algorithms that receive various engine operating parameters to predict soot accumulation levels in the PF. The operating parameters include duration and number of accelerations, duration of operation at constant RPM above idle, and idle time. Inaccurate soot accumulation predictions could lead to premature replacement or cleaning of a OC/PF. In addition, the various parameters used by the more complex algorithms require the use of application specific sensors that add to production costs and may require periodic maintenance and/or replacement. Accordingly, it is desirable to provide a less complex monitoring system that provides a more accurate depiction of PF health utilizing existing sensors.

SUMMARY OF THE INVENTION

In accordance with an exemplary embodiment, a monitoring system for a single can oxidation catalyst (OC)/particulate filter (PF) member includes a controller including a first temperature sensor input configured to receive a first exhaust temperature upstream of an OC portion of the single can OC/PF member, a second temperature sensor input configured to receive a second exhaust temperature downstream of the first temperature. The controller is configured and disposed to calculate an exothermic capacity of the OC portion and determine washcoat deterioration of a PF portion of the single can OC/PF member based on the exothermic capacity of the OC portion.

In accordance with another exemplary embodiment, an exhaust system for a motor vehicle includes a metal oxidation catalyst (MOC) member configured and disposed to fluidically connect to an exhaust manifold of the motor vehicle, a selective catalytic reduction device fluidically connected to the exhaust system downstream of the MOC member, a single can oxidation catalyst (OC)/particulate filter (PF) member including a housing surrounding an OC portion and a PF portion, the PF portion being arranged downstream of the OC portion, and a monitoring system for the a single can OC/PF member. The monitoring system includes a controller including a first temperature sensor input configured to receive a first exhaust temperature upstream of an OC portion of the single can OC/PF member, a second temperature sensor input configured to receive a second exhaust temperature downstream of the first temperature. The controller is configured and disposed to calculate an exothermic capacity of the OC portion and determine washcoat deterioration of a PF portion of the single can OC/PF member based on the exothermic capacity of the OC portion.

In accordance with yet another exemplary embodiment, a method of determining washcoat deterioration of a particulate filter (PF) portion of a single can oxidation catalyst (OC)/particulate filter (PF) member comprising sensing a first temperature upstream of an oxidation catalyst (OC) portion of the single can OC/PF member, sensing a second temperature downstream of the first temperature, determining a temperature differential between the first temperature and the second temperature, calculating an exothermic capacity of the OC portion based on the temperature differential, and determining a washcoat deterioration level of the PF portion based on the exothermic capacity of the OC portion.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 2 is a block diagram illustrating the monitoring system of FIG. 1; and

FIG. 3 is a flow diagram illustrating a method of monitoring a single can OC/PF member in accordance with an exemplary embodiment.

DESCRIPTION OF THE EMBODIMENTS

Figure 1:
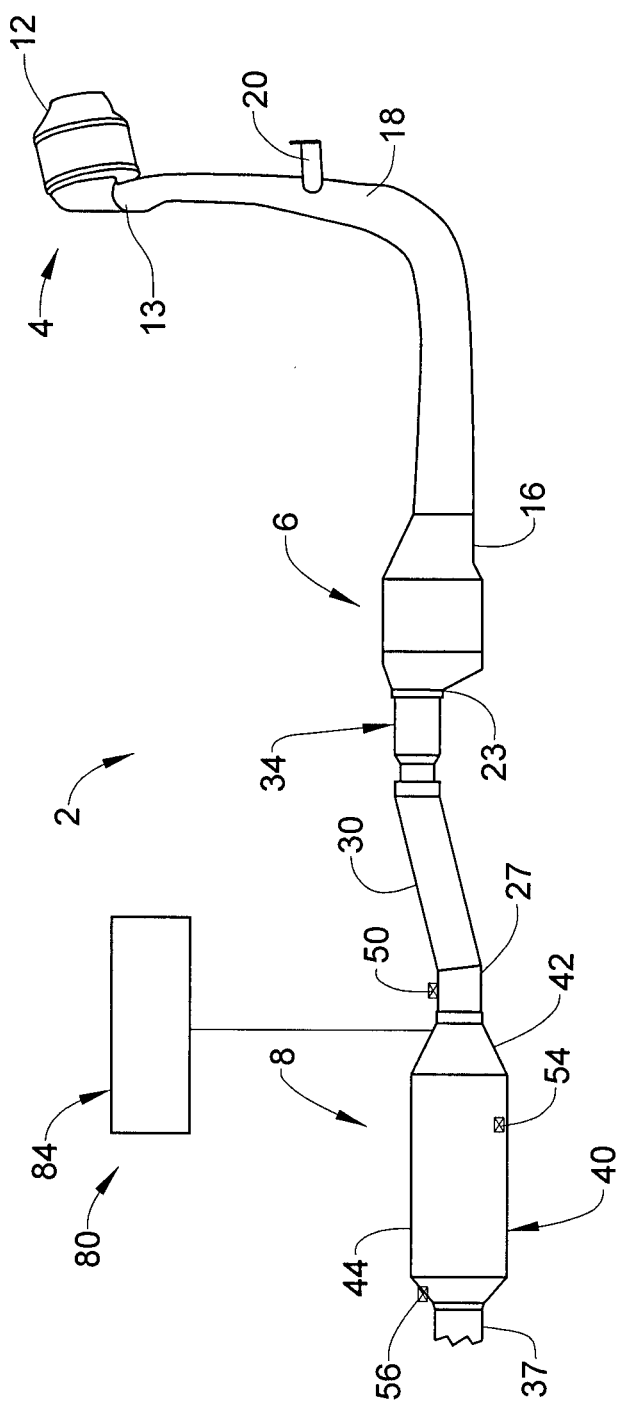
FIG. 1 is a perspective view of a portion of an exhaust system for a motor vehicle including a single can oxidation catalyst (OC)/particulate filter (PF) member and a monitoring system, in accordance with an exemplary embodiment.

The following description is merely exemplary in nature and is not intended to limit the present disclosure, its application or uses. It should be understood that throughout the drawings, corresponding reference numerals indicate like or corresponding parts and features. An exhaust system, in accordance with an exemplary embodiment, is illustrated generally at 2. Exhaust system 2 is provided with a plurality of emission reduction devices including a metal oxidation catalyst (MOC) member 4 fluidically connected to a selective catalytic reduction (SCR) device 6 and a single can oxidation catalyst (OC)/particulate filter (PF) member 8. More specifically, MOC member 4 includes an inlet 12 that may be connected to an exhaust manifold of a motor vehicle (not shown) and an outlet 13. Outlet 13 is fluidically connected to an inlet 16 of SCR device 6 through a first exhaust pipe 18. A urea injector 20 may be arranged between MOC member 4 and SCR device 6. SCR device 6 includes an outlet 23 fluidically connected to an inlet 27 of single can OC/PF member 8 through a second exhaust pipe 30. A hydro-carbon injector (HCI) 34 may be arranged between SCR device 6 and single can OC/PF member 8. Single can OC/PF member 8 includes an outlet 37 that is fluidically connected to ambient.

In accordance with an exemplary embodiment, single can OC/PF member 8 includes a housing 40 that surrounds an oxidation catalyst (OC) portion 42 and a particulate filter (PF) portion 44. A first temperature sensor 50 is mounted to second exhaust pipe 30 adjacent to inlet 27 and a second temperature sensor 54 is mounted to housing 40 at an interface (not separately labeled) between OC portion 42 and PF portion 44. Single can OC/PF member 8 may also include a third temperature sensor 56 mounted to housing 40 adjacent outlet 37. PF portion 44 includes a catalytic washcoat that contributes to a reduction in emissions passing through exhaust system 2. Over time, the washcoat deteriorates reducing the overall efficacy of PF portion 44. In order to predict when the washcoat may no longer be providing a positive contribution to emissions reduction, exhaust system 2 includes a monitoring system 80. As will be detailed more fully below, monitoring system 80 provides partial volume monitoring (PVM) of an operational efficacy of OC portion 42. More specifically, monitoring system 80 determines hydrocarbon conversion efficiency of PF portion 44 based on whether OC portion 42 continues to convert hydrocarbons at desirable levels.

As shown in FIG. 2, monitoring system 80 includes a controller 84 having a central processing unit (CPU) 86 and a memory 88. As will be discussed more fully below memory 88 stores at least one threshold exothermic capacity value 89 for single can OC/PF member 8. The at least one threshold value is associated with the particular single can OC/PF member 8 and provides a correlation between exothermic capacity of OC portion 42 and catalytic washcoat deterioration in PF portion 44. Controller 84 also includes a first temperature sensor input 90 that is operatively connected to first temperature sensor 50. Controller 84 also includes a second temperature sensor input 92 that is operatively connected to second temperature sensor 54. As will also be detailed more fully below, following an injection of hydro-carbon from HCI 34, controller 84 determines an exothermic capacity of OC portion 42 based on a temperature differential sensed between first and second temperature sensors 50 and 54. The exothermic capacity of OC portion 42 provides an indication of hydrocarbon conversion efficiency of PF portion 44. If the exothermic capacity of OC portion 42 is below a predetermined configurable exothermic capacity threshold value 89 stored in memory 88, controller 84 provides a signal through an output 94. The signal may pass from output 94 to an onboard display 96 to warn an operator that single can OC/PF member 8 is in need of replacement.

Reference will now follow to FIG. 3 in describing a method 200 of monitoring single can OC/PF member 8. Monitoring is initiated in block 210. Controller 84 receives an exhaust temperature input from first temperature sensor 50 as indicated in block 212. Controller 84 also receives a second exhaust temperature input from second temperature sensor 54, as indicated in block 214. Controller 84 then determines a temperature differential between first and second exhaust temperature inputs to calculate an exothermic capacity of OC portion 42 in block 216. In block 220, controller 84 compares the exothermic capacity of OC portion 42 with predetermined exothermic capacity threshold value 89 stored in memory 88. If the exothermic capacity of OC portion 42 is at a desirable level e.g., above, or greater than, predetermined exothermic capacity threshold value 89, controller 84 provides an output signal indicating a "test pass" value to block 224. If however, temperature of the exothermic capacity of OC portion 42 is below the desired level, e.g., below, or less than, predetermined exothermic capacity threshold value 89 controller 84 provides an output signal indicating a "test fail" value in block 224. Monitoring may end at block 226. A test fail value informs drivers, maintenance personnel, or the like, that single can OC/PF member 8 may need repair and/or replacement.

At this point it should be understood that the monitoring system described in accordance with an exemplary embodiment, determines hydrocarbon conversion efficiency of a particulate filter (PF) portion of a single can OC/PF member by comparing exothermic capacity of the oxidation catalyst portion to a known threshold value. It should also be understood that the exemplary embodiments may be employed in both gasoline based and diesel based engine systems. Further, it should be understood that the present invention determines hydrocarbon conversion efficiency of the particulate filter (PF) portion using exiting temperature sensors, and that the controller may be incorporated into existing controls by providing desired programming.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A monitoring system for a single can oxidation catalyst (OC)/particulate filter (PF) member comprising:
   a controller including a first temperature sensor input configured to receive a first exhaust temperature upstream of an OC portion of the single can OC/PF member, a second temperature sensor input configured to receive a second exhaust temperature downstream of the first temperature, wherein the controller is configured and disposed to calculate an exothermic capacity of the OC portion and determine washcoat deterioration of a PF portion of the single can OC/PF member based on the exothermic capacity of the OC portion;
   a first temperature sensor operatively connected to the first temperature sensor input, the first temperature sensor being arranged adjacent an inlet of the OC portion and operable to capture a first exhaust temperature; and
   a second temperature sensor operatively connected to the second temperature sensor input, the second temperature sensor being arranged at an interface of the OC portion and the PF portion and operable to capture a second exhaust temperature, wherein the controller includes a memory having stored therein at least one predetermined exothermic capacity threshold value, the controller being configured and disposed to compare the exothermic capacity of the OC portion as determined based on a difference between the first exhaust temperature and the second exhaust temperature with the predetermined exothermic capacity threshold value to determine washcoat deterioration of the PF portion and provide a maintenance alert associated with the single can OC/PF member if the difference between the first exhaust temperature and second exhaust temperature is less than the predetermined exothermic capacity threshold value.

2. An exhaust system for a motor vehicle comprising:

a metal oxidation catalyst (MOC) member configured and disposed to fluidically connect to an exhaust manifold of the motor vehicle;

a selective catalytic reduction (SCR) device fluidically connected to the exhaust system downstream of the MOC member;

a single can oxidation catalyst (OC)/particulate filter (PF) member including a housing surrounding an OC portion and a PF portion, the PF portion being arranged downstream of the OC portion; and a monitoring system for the single can oxidation catalyst (OC)/particulate filter (PF) member, the monitoring system includes:

a controller including a first temperature sensor input configured to receive a first exhaust temperature upstream of an OC portion of the single can OC/PF member, a second temperature sensor input configured to receive a second exhaust temperature downstream of the first temperature, wherein the controller is configured and disposed to calculate an exothermic capacity of the OC portion and determine washcoat deterioration of a PF portion of the single can OC/PF member based on the exothermic capacity of the OC portion;

a first temperature sensor operatively connected to the first temperature sensor input, the first temperature sensor being arranged adjacent an inlet of the OC portion and operable to capture a first exhaust temperature; and a second temperature sensor operatively connected to the second temperature sensor input, the second temperature sensor being arranged at an interface of the OC portion and the PF portion and operable to capture a second exhaust temperature, wherein the controller includes a memory having stored therein at least one predetermined exothermic capacity threshold value, the controller being configured and disposed to compare the exothermic capacity of the OC portion as determined based on a difference between the first exhaust temperature and the second exhaust temperature with the predetermined exothermic capacity threshold value to determine washcoat deterioration of the PF portion and provide a maintenance alert associated with the single can OC/PF member if the difference between the first exhaust temperature and second exhaust temperature is less than the predetermined exothermic capacity threshold value.

3. The exhaust system according to claim 2 further comprising: a urea injector arranged between the MOC member and the SCR device and a hydro-carbon injector (HCI) arranged between the SCR device and the OC/PF member.

* * * * *